Patented Feb. 26, 1952 2,586,884

UNITED STATES PATENT OFFICE 2,586,884

COPOLYMERS OF DI BETA, GAMMA UNSATURATED ALKENYL ALPHA, BETA UNSATURATED ALKENYLPHOSPHONATES WITH UNSATURATED ALKYD RESINS

Arthur Dock Fon Toy, Chicago, and Lee V. Brown, Riverdale, Ill., assignors to Victor Chemical Works, a corporation of Illinois No Drawing. Application October 11, 1947, Serial No. 779,417

15 Claims. (Cl. 260—45.4)

This invention relates to copolymers of di beta, gamma unsaturated alkenyl alpha, beta unsaturated alkenylphosphonates and unsaturated alkyd resins.

We have discovered that resinous copolymers having many useful characteristics can be prepared by reacting di beta, gamma unsaturated alkenyl alpha, beta unsaturated alkenylphosphonates and unsaturated alkyd resins. The new copolymers are flame resistant and form solid products that may be cast, machined, polished and otherwise treated.

The reaction is preferably, although not necessarily, catalyzed by the use of a suitable catalyst. These catalysts are ordinarily organic peroxides. Although the reaction will proceed very slowly without the use of a catalyst, it is preferred that a catalyst is used. The ingredients react in all proportions to produce solid copolymers.

The unsaturated alkyd esters may be made by reacting polyhydroxy alcohols with unsaturated polycarboxylic acid anhydrides to produce unsaturated polyesters. For example, the unsaturated alkyd resin, diethylene glycol maleate, is made by mixing equal molar proportions of maleic anhydride and diethylene glycol, and heating for about twelve hours at 175 to 180° C. in an atmosphere of carbon dioxide, to produce a viscous liquid unsaturated polyester, having an acid number of about 25.

The alpha, beta unsaturated alkenyl isoalkenylphosphonates may be prepared in accordance with the process described in the A. D. F. Toy U. S. Patent No. 2,425,766, issued August 19, 1947, which comprises reacting an alpha, beta unsaturated alkenyl phosphorus oxydichloride with a beta, gamma unsaturated alcohol in the presence of pyridine, and separating the dialkenyl alkenylphosphonate from the reaction mixture. The diesters which have been found most suitable for the present purpose include diallyl isobutenylphosphonate, dimethallyl isobutenylphosphonate, diallyl isooctenylphosphonate, dimethallyl isooctenylphosphonate, diallyl styrylphosphonate, dimethallyl styrylphosphonate, dicrotyl isobutenylphosphonate, and in general the diallyl, methallyl, and crotyl esters of the isoalkenylphosphonic acids having from four to eight carbon atoms.

Suitable catalysts include the organic peroxygen compounds such as benzoyl peroxide, acetyl peroxide, t-butyl perbenzoate, and the like. Benzoyl peroxide is generally preferred because of its availability and the ease with which it may be incorporated in the mixtures.

The alkenylphosphonates and unsaturated alkyl resins may be copolymerized in all proportions, though those within the range of five to eighty parts by weight of the alkenyl phosphonate to ninety-five to twenty parts of the unsaturated alkyl resin give copolymer products having the more desirable physical and flame resisting characteristics.

The general procedure employed in producing the copolymer products is to mix the dialkenyl alkenylphosphonate esters with the desired proportion of the unsaturated alkyl resin, and a polymerization catalyst, at room temperature. The liquid or semi-liquid mixture is then poured into suitable mold, or used to impregnate glass fabric, textile fabrics, paper, and similar fibrous products. The mixture is then heated at a polymerizing temperature for a period of time sufficient to effect completion of the copolymerization.

The time and temperature conditions may be varied over a wide range to meet the desired operating conditions for specific type products, etc. For example, when relatively thick molded articles are to be produced a low temperature and long period of time are employed. However, in the commercial production of glass and other fabric laminates it is desirable to use a short period of time at a higher temperature. Generally a temperature of 70° to 125° C. will be satisfactory. The time required to complete the copolymerization may vary from eighteen or twenty hours down to about one hour depending on the temperature, amount of catalyst and other variables, such as the type of monomer, the proportions and thickness of the polymer product desired and the like.

Typical examples of the production of the copolymer products are illustrated in the following tables.

Table 1 shows the copolymerization of diallyl and dimethylallyl iso-butenyl-phosphonate esters with the unsaturated diethylene glycol maleate, using 2% benzoyl peroxide catalyst and heating the mixture for sixteen hours at 85° C. in an atmosphere of nitrogen. The mixtures were heated in glass bottles in layers of one-eighth to one-fourth inch in thickness.

TABLE 1

| Example Number | Alkenyl phosphonate parts by wt. | Unsaturated alkyd resin parts by wt. | Resin Product |
|---|---|---|---|
| A-1 | Diallyl i-butenyl-phosphonate, five. | 95 | Hard, yellow solid, burns slowly. |
| A-2 | 30 | 70 | Hard, light yellow, clear solid, self-extinguishing. |
| A-3 | 60 | 40 | Same. |
| A-4 | 95 | 5 | Hard, light yellow, clear solid, burns slowly. |
| A-5 | Dimethallyl i-butenyl-phosphonate, five. | 95 | Hard, clear, yellow resin, burns, slowly. |
| A-6 | 30 | 70 | Hard, clear, yellow resin, self-extinguishing. |
| A-7 | 50 | 50 | Hard, clear, yellowish green resin, burns slowly. |
| A-8 | 80 | 20 | Same. |
| A-9 | 95 | 5 | Hard, opalescent, yellowish green resin, burns fairly rapidly. |

The above examples show that optimum flame resistance is obtained when the ratios of the alkenylphosphonate to unsaturated alkyd resin are between thirty to seventy and eighty to twenty.

The term "self-extinguishing" in the above table means that when a piece of the resin ignited in a flame is withdrawn from the flame it ceases burning. The term "burns slowly" means that the resin will just continue to burn when removed from the flame.

Table 2 shows the copolymerization of diallyl and dimethallyl iso-octenylphosphonate esters and diallyl styrylphosphonate with unsaturated alkyd resins. The alkyd resin, the catalyst, and polymerizing conditions employed were the same as those of Table 1.

TABLE 2

| Example Number | Alkenyl phosphonate parts by wt. | Unsaturated alkyd resin parts by wt. | Resin Product |
|---|---|---|---|
| B-1 | Diallyl i-octenyl-phosphonate, thirty. | 70 | Light yellow, hard, clear, resin burns slowly. |
| B-2 | Dimethallyl i-octenyl-phosphonate, ninety. | 10 | Soft gel. |
| B-3 | 70 | 30 | Tough, artgum like, solid resin. |
| B-4 | 50 | 50 | Hard, yellow, substantially clear solid. Burns at moderate rate. |
| B-5 | 35 | 65 | Hard, clear, yellow resin, burns slowly. |
| B-6 | Diallyl styryl-phosphonate, thirty-five. | 65 | Hard, clear, yellow resin, burns at moderate rate. |
| B-7 | 80 | 20 | Hard, clear, light yellow resin. Burns rapidly. |

Satisfactory resin products may be produced by copolymerizing mixtures of the alkenylphosphonates with unsaturated alkyd resins. For example, a mixture of fifteen parts by weight of diallyl isobutenylphosphonate, fifteen parts dimethallyl i-octenylphosphonate, seventy parts diethylene glycol maleate, and 2% benzoyl peroxide was poured into a glass mold and heated in a nitrogen atmosphere at 85° C. for sixteen hours to produce a hard, clear, yellow resin of self-extinguishing character.

The copolymer resin products of the present invention may be used in the production of sheets, coatings, articles of various shapes and sizes, in the production of strong laminated glass fabric and other type fabrics. The resins may be sawed, machined, and polished without difficulty.

In order to illustrate the use of the resins in the production of laminated fabrics, the following tests were conducted.

*Example C-1*

A mixture of three parts by weight of diallyl isobutenylphosphonate, seven parts Laminac No. 4201 (a commercial unsaturated alkyd resin produced by the American Cyanamid Co.), and 1% benzoyl peroxide was used to impregnate two plies of glass fiber cloth. The impregnated fabric was then placed between cellophane sheets and heated for ten minutes at 70–90° C., twenty-two minutes at 90–120° C., and twenty-eight minutes at 120–125° C. The resulting laminate was a hard, strong, glossy, flexible sheet.

*Example C-2*

In another test the same mixture was used to impregnate a sheet of two ply absorbent paper. The copolymerization was carried out under the same heating conditions. The resulting product was a strong, hard, glossy, semi-flexible laminate.

Although the invention has been described in considerable detail as related to several embodiments of the same, it is our intention that the invention be not limited by any of the details of description unless otherwise specified, but rather be construed broadly within its spirit and scope as set out in the accompanying claims.

We claim:

1. A resin product obtained by copolymerizing three parts by weight of diallyl isobutenylphosphonate and seven parts of diethylene glycol maleate in the presence of about 2% by weight of the reactants of benzoyl peroxide, said resin product being self-extinguishing to burning.

2. A resin product obtained by copolymerizing six parts by weight of diallyl isobutenylphosphonate and four parts of diethylene glycol maleate in the presence of about 2% by weight of the reactants of benzoyl peroxide, said resin product being self-extinguishing to burning.

3. A resin product obtained by copolymerizing three parts by weight of dimethallyl isobutenylphosphonate and seven parts of diethylene glycol maleate in the presence of about 2% by weight of the reactants of bezoyl peroxide, said resin product being self-extinguishing to burning.

4. A resin product obtained by copolymerizing three parts by weight of diallyl isooctenylphosphonate and seven parts of diethylene glycol maleate in the presence of about 2% by weight of the reactants of benzoyl peroxide, said resin product being self-extinguishing to burning.

5. A resin product obtained by copolymerizing 3.5 parts by weight of dimethallyl isooctenylphosphonate and 6.5 parts of diethylene glycol maleate in the presence of about 2% by weight of the reactants of benzoyl peroxide, said resin product being flame resistant.

6. The product of claim 11 wherein the alkenylphosphonate is diallyl isobutenylphosphonate.

7. The product of claim 11 wherein the alkenylphosphonate is dimethallyl isooctenylphosphonate.

8. The product of claim 11 wherein the alkenylphosphonate is dimethallyl isobutenylphosphonate.

9. The product of claim 11 wherein the alkyd resin is diethylene glycol maleate.

10. The product of claim 11 wherein the ratio of the phosphonate to the alkyd resin is between 30 to 70 and 80 to 20, parts by weight.

11. A resin product obtained by copolymerizing from 5 to 80 parts by weight of a di beta, gamma unsaturated substituted ethenyl phosphonate selected from the group consisting of diallyl and dimethallyl isobutenyl, isooctenyl and styryl phosphonates, and from 95 to 20 parts of an unsaturated alkyd resin comprising the reaction product of an alpha,beta unsaturated polycarboxylic acid and a polyhydroxy alcohol, said resin product being flame resistant.

12. A resin product obtained by copolymerizing 30 to 80 parts by weight of diallyl isobutenylphosphonate and 70 to 20 parts of diethylene glycol maleate, said resin product being flame resistant.

13. A composition of matter comprising a laminated fibrous material impregnated with a resin product obtained by copolymerizing from 5 to 80 parts by weight of a di beta, gamma unsaturated substituted ethenyl phosphonate selected from the group consisting of diallyl and dimethallyl isobutenyl, isooctenyl and styryl phosphonates, and from 95 to 20 parts of an unsaturated alkyd resin comprising the reaction product of an alpha,beta unsaturated polycarboxylic acid and a polyhydroxy alcohol, said resin product being flame resistant.

14. A composition of matter comprising a laminated fibrous material impregnated with a resin product obtained by copolymerizing 30 to 80 parts by weight of diallyl isobutenylphosphonate and 70 to 20 parts of diethylene glycol maleate, said resin product being flame resistant.

15. A resin product obtained by copolymerizing 5 to 80 parts by weight of diallyl isobutenylphosphonate and from 95 to 20 parts of diethylene glycol maleate in the presence of benzoyl peroxide, said resin product being flame resistant.

ARTHUR DOCK FON TOY.
LEE V. BROWN.

REFERENCES CITED

The following references are of record in the file of this patent:

UNITED STATES PATENTS

| Number | Name | Date |
|---|---|---|
| 2,409,633 | Kropa | Oct. 22, 1946 |
| 2,425,766 | Toy | Aug. 19, 1947 |
| 2,443,740 | Kropa | July 22, 1948 |

OTHER REFERENCES

Warren, p. 39, "Plastics" (of Chicago), July 1947.